(12) United States Patent
Fein et al.

(10) Patent No.: US 8,909,738 B2
(45) Date of Patent: *Dec. 9, 2014

(54) REDUNDANT DATA FORWARDING STORAGE

(71) Applicant: Tajitshu Transfer Limited Liability Company, Wilmington, DE (US)

(72) Inventors: Gene Fein, Malibu, CA (US); Edward Merritt, Lenox, MA (US)

(73) Assignee: Tajitshu Transfer Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,124

(22) Filed: May 30, 2013

(65) Prior Publication Data

US 2013/0262632 A1 Oct. 3, 2013

Related U.S. Application Data

(63) Continuation of application No. 12/052,345, filed on Mar. 20, 2008, now Pat. No. 8,458,285.

(51) Int. Cl.
*G06F 15/16* (2006.01)
*H04L 29/08* (2006.01)

(52) U.S. Cl.
CPC .................................. *H04L 67/1097* (2013.01)
USPC ........................................................ 709/218

(58) Field of Classification Search
CPC .................................................. H04L 67/1097
USPC ........................................................ 709/218
See application file for complete search history.

(56) References Cited

U.S. PATENT DOCUMENTS

| 3,786,424 | A | 1/1974 | McVoy et al. |
| 5,751,928 | A | 5/1998 | Bakalash |
| 5,774,553 | A | 6/1998 | Rosen |
| 5,787,258 | A | 7/1998 | Costa et al. |
| 5,978,485 | A | 11/1999 | Rosen |
| 5,978,839 | A | 11/1999 | Okuhara et al. |
| 6,085,030 | A | 7/2000 | Whitehead et al. |

(Continued)

FOREIGN PATENT DOCUMENTS

| AU | 2009296500 | 1/2013 |
| AU | 2009296744 | 1/2013 |

(Continued)

OTHER PUBLICATIONS

Australian Exam Report, re AU Application No. 2009296500, dated Oct. 24, 2012.

(Continued)

*Primary Examiner* — Jerry Dennison
(74) *Attorney, Agent, or Firm* — Knobbe Martens Olson & Bear LLP

(57) ABSTRACT

Methods and apparatus, including computer program products, for redundant data forwarding are described. In one respect, the method includes intermittently forwarding the portion of the data among the first memory and memories of other nodes in the first network without storing the portion of data on any physical storage device of the interconnected nodes in the first network. The method may also include intermittently forwarding the first copy of the portion of the data among the second memory and memories of other nodes in the second network without storing the first copy of the portion of the data on any physical storage device of the interconnected nodes in the second network.

20 Claims, 5 Drawing Sheets

(56) References Cited

U.S. PATENT DOCUMENTS

| | | |
|---|---|---|
| 6,151,395 A | 11/2000 | Harkins |
| 6,205,478 B1 | 3/2001 | Sugano et al. |
| 6,219,691 B1 | 4/2001 | Youn |
| 6,260,159 B1 | 7/2001 | Garnett et al. |
| 6,298,380 B1 | 10/2001 | Coile et al. |
| 6,505,213 B1 | 1/2003 | Kamada et al. |
| 6,549,957 B1 | 4/2003 | Hanson et al. |
| 6,587,866 B1 | 7/2003 | Modi et al. |
| 6,650,640 B1 | 11/2003 | Muller et al. |
| 6,677,976 B2 | 1/2004 | Parker et al. |
| 6,684,258 B1 | 1/2004 | Gavin et al. |
| 6,721,275 B1 | 4/2004 | Rodeheffer et al. |
| 6,724,767 B1 | 4/2004 | Chong et al. |
| 6,745,289 B2 | 6/2004 | Gruner et al. |
| 6,907,447 B1 | 6/2005 | Cooperman et al. |
| 6,941,338 B1 | 9/2005 | Madsen |
| 6,983,303 B2 | 1/2006 | Pellegrino et al. |
| 6,985,476 B1 | 1/2006 | Elliott et al. |
| 7,007,142 B2 | 2/2006 | Smith |
| 7,035,933 B2 | 4/2006 | O'Neal et al. |
| 7,043,530 B2 | 5/2006 | Isaacs et al. |
| 7,061,923 B2 | 6/2006 | Dugan et al. |
| 7,061,925 B2 | 6/2006 | Joshi |
| 7,103,824 B2 | 9/2006 | Halford |
| 7,120,631 B1 | 10/2006 | Vahalia et al. |
| 7,136,638 B2 | 11/2006 | Wacker et al. |
| 7,139,820 B1 | 11/2006 | O'Toole, Jr. et al. |
| 7,143,170 B2 | 11/2006 | Swildens et al. |
| 7,191,298 B2 | 3/2007 | Kaminsky et al. |
| 7,197,576 B1 | 3/2007 | Lo et al. |
| 7,209,973 B2 | 4/2007 | Tormasov et al. |
| 7,218,952 B1 | 5/2007 | Alperovich et al. |
| 7,240,214 B2 | 7/2007 | Gazzetta et al. |
| 7,257,817 B2 | 8/2007 | Cabrera et al. |
| 7,266,776 B2 | 9/2007 | Quillen et al. |
| 7,274,706 B1 | 9/2007 | Nguyen et al. |
| 7,277,941 B2 | 10/2007 | Ignatius et al. |
| 7,295,556 B2 | 11/2007 | Roese et al. |
| 7,320,059 B1 | 1/2008 | Armangau et al. |
| 7,327,731 B1 | 2/2008 | Kumar et al. |
| 7,346,063 B1 | 3/2008 | Herbst |
| 7,346,909 B1 | 3/2008 | Eldar et al. |
| 7,356,540 B2 | 4/2008 | Smith et al. |
| 7,356,567 B2 | 4/2008 | Odell et al. |
| 7,363,316 B2 | 4/2008 | Anderson et al. |
| 7,366,868 B2 | 4/2008 | Reuter et al. |
| 7,404,002 B1 | 7/2008 | Pereira |
| 7,415,506 B2 | 8/2008 | Gajjar et al. |
| 7,424,514 B2 | 9/2008 | Noble et al. |
| 7,426,471 B1 | 9/2008 | Briscoe et al. |
| 7,426,574 B2 | 9/2008 | Liao |
| 7,426,637 B2 | 9/2008 | Risan et al. |
| 7,426,745 B2 | 9/2008 | McCarty |
| 7,428,219 B2 | 9/2008 | Khosravi |
| 7,428,540 B1 | 9/2008 | Coates et al. |
| 7,430,584 B1 | 9/2008 | Fein et al. |
| 7,457,835 B2 | 11/2008 | Toebes et al. |
| 7,529,784 B2 | 5/2009 | Kavuri et al. |
| 7,599,997 B1 | 10/2009 | Fein et al. |
| 7,631,051 B1 | 12/2009 | Fein et al. |
| 7,631,052 B2 | 12/2009 | Fein et al. |
| 7,636,758 B1 | 12/2009 | Fein et al. |
| 7,636,759 B1 | 12/2009 | Fein et al. |
| 7,636,760 B1 | 12/2009 | Fein et al. |
| 7,636,761 B1 | 12/2009 | Fein et al. |
| 7,636,762 B1 | 12/2009 | Fein et al. |
| 7,636,763 B1 | 12/2009 | Fein et al. |
| 7,636,764 B1 | 12/2009 | Fein et al. |
| 7,668,926 B2 | 2/2010 | Fein et al. |
| 7,668,927 B2 | 2/2010 | Fein et al. |
| 7,673,009 B2 | 3/2010 | Fein et al. |
| 7,685,248 B1 | 3/2010 | Fein et al. |
| 7,707,287 B2 | 4/2010 | Shafir et al. |
| 7,783,608 B2 | 8/2010 | Shitomi |
| 7,844,695 B2 | 11/2010 | Fein et al. |
| 7,865,586 B2 | 1/2011 | Cohn |
| 7,877,456 B2 | 1/2011 | Fein et al. |
| 7,924,888 B2 | 4/2011 | Schultze et al. |
| 7,974,645 B2 | 7/2011 | Choi-Grogan |
| 8,266,237 B2 | 9/2012 | Moore et al. |
| 8,352,635 B2 | 1/2013 | Fein et al. |
| 8,386,585 B2 | 2/2013 | Fein et al. |
| 8,452,844 B2 | 5/2013 | Fein et al. |
| 8,458,285 B2 | 6/2013 | Fein et al. |
| 8,554,866 B2 | 10/2013 | Fein et al. |
| 8,599,678 B2 | 12/2013 | Fein et al. |
| 2002/0059444 A1 | 5/2002 | Shinno |
| 2002/0158899 A1 | 10/2002 | Raymond |
| 2002/0194371 A1 | 12/2002 | Kadoi |
| 2003/0093463 A1 | 5/2003 | Graf |
| 2003/0101200 A1 | 5/2003 | Koyama et al. |
| 2003/0137880 A1 | 7/2003 | Barrenscheen et al. |
| 2003/0158958 A1 | 8/2003 | Chiu |
| 2004/0064633 A1 | 4/2004 | Oota |
| 2004/0093390 A1 | 5/2004 | Oberdorfer |
| 2004/0165525 A1 | 8/2004 | Burak |
| 2004/0223503 A1 | 11/2004 | Lynch et al. |
| 2004/0250029 A1 | 12/2004 | Ji et al. |
| 2005/0010647 A1 | 1/2005 | Durham |
| 2005/0010685 A1 | 1/2005 | Ramnath et al. |
| 2005/0015466 A1 | 1/2005 | Tripp |
| 2005/0044162 A1 | 2/2005 | Liang et al. |
| 2005/0071568 A1 | 3/2005 | Yamamoto et al. |
| 2005/0131984 A1 | 6/2005 | Hofmann et al. |
| 2005/0201409 A1 | 9/2005 | Griswold et al. |
| 2005/0216473 A1 | 9/2005 | Aoyagi |
| 2005/0216727 A1 | 9/2005 | Chattopadhyay et al. |
| 2005/0240749 A1 | 10/2005 | Clemo et al. |
| 2005/0243823 A1 | 11/2005 | Griswold et al. |
| 2006/0031593 A1 | 2/2006 | Sinclair |
| 2006/0091007 A1 | 5/2006 | Inoue et al. |
| 2006/0095512 A1 | 5/2006 | Noma |
| 2006/0143505 A1 | 6/2006 | Olarig et al. |
| 2006/0159456 A1 | 7/2006 | Gumaste et al. |
| 2006/0209822 A1 | 9/2006 | Hamamoto et al. |
| 2006/0212551 A1 | 9/2006 | Kao et al. |
| 2006/0242212 A1 | 10/2006 | Brinkmann et al. |
| 2007/0005694 A1 | 1/2007 | Popkin et al. |
| 2007/0011097 A1 | 1/2007 | Eckleder |
| 2007/0050446 A1 | 3/2007 | Moore |
| 2007/0050761 A1 | 3/2007 | Hester et al. |
| 2007/0055765 A1 | 3/2007 | Lisiecki et al. |
| 2007/0058606 A1 | 3/2007 | Koskelainen |
| 2007/0073965 A1 | 3/2007 | Rajakarunanayake |
| 2007/0079087 A1 | 4/2007 | Wang et al. |
| 2007/0171832 A1 | 7/2007 | Agmon et al. |
| 2007/0186068 A1 | 8/2007 | Agrawal |
| 2007/0195772 A1 | 8/2007 | Shadish |
| 2007/0214105 A1 | 9/2007 | Sfarti et al. |
| 2007/0266220 A1 | 11/2007 | Nelson |
| 2007/0271349 A1 | 11/2007 | Clemo et al. |
| 2008/0013448 A1 | 1/2008 | Horie et al. |
| 2008/0016564 A1 | 1/2008 | Claudatos et al. |
| 2008/0037777 A1 | 2/2008 | Ignatius et al. |
| 2008/0059495 A1 | 3/2008 | Kiessig et al. |
| 2008/0071855 A1 | 3/2008 | Farber et al. |
| 2008/0084330 A1 | 4/2008 | Picard |
| 2008/0091744 A1 | 4/2008 | Shitomi et al. |
| 2008/0095075 A1 | 4/2008 | Monier |
| 2008/0101277 A1 | 5/2008 | Taylor et al. |
| 2008/0104085 A1 | 5/2008 | Papoutsakis et al. |
| 2008/0114891 A1 | 5/2008 | Pereira |
| 2008/0144655 A1 | 6/2008 | Beam et al. |
| 2008/0151893 A1 | 6/2008 | Nordmark et al. |
| 2008/0155094 A1 | 6/2008 | Roese et al. |
| 2008/0155252 A1 | 6/2008 | Nambiar |
| 2008/0155275 A1 | 6/2008 | Natarajan et al. |
| 2008/0155537 A1 | 6/2008 | Dinda et al. |
| 2008/0181224 A1 | 7/2008 | Van Hensbergen et al. |
| 2008/0222415 A1 | 9/2008 | Munger et al. |
| 2008/0222492 A1 | 9/2008 | Earhart et al. |
| 2008/0225842 A1 | 9/2008 | Goldfein et al. |
| 2008/0225888 A1 | 9/2008 | Valluri et al. |
| 2008/0228943 A1 | 9/2008 | Balus et al. |

(56) References Cited

U.S. PATENT DOCUMENTS

| | | |
|---|---|---|
| 2008/0313318 A1 | 12/2008 | Vermeulen et al. |
| 2009/0006808 A1 | 1/2009 | Blumrich et al. |
| 2009/0036171 A1 | 2/2009 | Palenius |
| 2009/0063187 A1 | 3/2009 | Johnson et al. |
| 2009/0063419 A1 | 3/2009 | Nurminen et al. |
| 2009/0067322 A1 | 3/2009 | Shand et al. |
| 2009/0092124 A1 | 4/2009 | Singhal et al. |
| 2009/0104978 A1 | 4/2009 | Ben-Ami |
| 2009/0141621 A1 | 6/2009 | Fan et al. |
| 2009/0204320 A1 | 8/2009 | Shaffer et al. |
| 2009/0228593 A1 | 9/2009 | Takeda |
| 2009/0234933 A1 | 9/2009 | Fein et al. |
| 2009/0238167 A1 | 9/2009 | Fein et al. |
| 2009/0254567 A1 | 10/2009 | Fein et al. |
| 2009/0300635 A1 | 12/2009 | Ferris |
| 2010/0185581 A1 | 7/2010 | Bakalash |
| 2011/0125721 A1 | 5/2011 | Fein |
| 2011/0138075 A1 | 6/2011 | Fein |
| 2011/0167131 A1 | 7/2011 | Fein |
| 2011/0179131 A1 | 7/2011 | Fein |
| 2013/0124336 A1 | 5/2013 | Fein |

FOREIGN PATENT DOCUMENTS

| | | |
|---|---|---|
| AU | 2009240392 | 2/2013 |
| AU | 2009244352 | 2/2013 |
| AU | 2009276965 | 2/2013 |
| AU | 2009296495 | 2/2013 |
| AU | 2009268716 | 3/2013 |
| AU | 2009296496 | 3/2013 |
| AU | 2009225859 | 9/2013 |
| AU | 2009268792 | 10/2013 |
| AU | 2009296490 | 11/2013 |
| CN | 1529964 | 9/2004 |
| CN | 1823506 | 8/2006 |
| CN | 1855857 A | 11/2006 |
| CN | 101188569 | 5/2008 |
| CN | 101330451 A | 12/2008 |
| EP | 0 458 567 | 5/1991 |
| EP | 0 722 591 | 6/1999 |
| EP | 1 048 998 | 11/2000 |
| EP | 1 266 308 | 12/2002 |
| EP | 1 968 257 | 9/2003 |
| EP | 1 357 476 A | 10/2003 |
| EP | 1406446 A1 | 4/2004 |
| EP | 1 802 051 | 11/2006 |
| EP | 1322068 B1 | 11/2006 |
| EP | 1 746 790 | 1/2007 |
| EP | 1 372 316 | 5/2007 |
| EP | 1798934 A1 | 6/2007 |
| EP | 1798937 A1 | 6/2007 |
| EP | 1826968 A1 | 8/2007 |
| EP | 1485787 B1 | 10/2007 |
| EP | 1776639 B1 | 12/2007 |
| EP | 1479236 B1 | 1/2008 |
| EP | 1 931 090 | 6/2008 |
| JP | 56-013857 | 2/1981 |
| JP | 56-116144 | 9/1981 |
| JP | 56-116145 | 9/1981 |
| JP | 60-241346 | 11/1985 |
| JP | 61-165889 | 7/1986 |
| JP | 06-021953 | 1/1994 |
| JP | 06-068047 | 3/1994 |
| JP | 10-254761 | 9/1998 |
| JP | 11-065911 | 3/1999 |
| JP | 2002-510409 | 4/2002 |
| JP | 2002-268952 | 9/2002 |
| JP | 2003-296176 | 10/2003 |
| JP | 2003-296179 | 10/2003 |
| JP | 2005-070987 | 3/2005 |
| JP | 2005-216241 | 8/2005 |
| JP | 2005-275937 | 10/2005 |
| JP | 2005-310126 | 11/2005 |
| JP | 2005-339325 | 12/2005 |
| JP | 2007-304665 | 11/2007 |
| JP | 2007-310673 | 11/2007 |
| JP | 2008-033406 | 2/2008 |
| JP | 2008-052340 | 3/2008 |
| JP | 2008-516304 | 5/2008 |
| JP | 2008-192129 | 8/2008 |
| JP | 2008-537258 | 9/2008 |
| JP | 2011-519097 | 6/2011 |
| JP | 2011-523120 | 8/2011 |
| JP | 2011-528141 | 11/2011 |
| WO | WO 94/04991 | 3/1994 |
| WO | WO 97/19427 A2 | 5/1997 |
| WO | WO 97/19427 A3 | 5/1997 |
| WO | WO 01/67303 | 9/2001 |
| WO | WO 02/052417 | 7/2002 |
| WO | WO 03/009544 | 1/2003 |
| WO | WO 2004/059529 | 7/2004 |
| WO | WO 2005/034441 | 4/2005 |
| WO | WO 2005/062578 | 7/2005 |
| WO | WO 2006/026567 | 3/2006 |
| WO | WO 2006/115594 | 11/2006 |
| WO | WO 2006/124084 | 11/2006 |
| WO | WO 2006/124217 | 11/2006 |
| WO | WO 2007/001631 | 1/2007 |
| WO | WO 2007/019689 | 2/2007 |
| WO | WO 2009/021289 | 2/2007 |
| WO | WO 2007/031593 | 3/2007 |
| WO | WO 2008/006079 | 1/2008 |
| WO | WO 2008/013036 | 1/2008 |
| WO | WO 2008/070958 | 6/2008 |
| WO | WO 2008/094930 | 8/2008 |
| WO | WO 2008/108699 | 9/2008 |
| WO | WO 2008/109390 | 9/2008 |
| WO | WO 2009/117259 | 9/2009 |
| WO | WO 2009/126418 | 10/2009 |
| WO | WO 2009/132345 | 10/2009 |
| WO | WO 2009/137571 | 11/2009 |
| WO | WO 2010/005928 | 1/2010 |
| WO | WO 2010/005935 | 1/2010 |
| WO | WO 2010/014368 | 2/2010 |
| WO | WO 2010/036712 | 4/2010 |
| WO | WO 2010/036881 | 4/2010 |
| WO | WO 2010/036883 | 4/2010 |
| WO | WO 2010/036886 | 4/2010 |
| WO | WO 2010/036887 | 4/2010 |
| WO | WO 2010/036891 | 4/2010 |

OTHER PUBLICATIONS

Canadian Office Action, re CA Application No. CA 2,727,457, dated May 9, 2013.
Canadian Office Action, re CA Application No. CA 2722,415, dated Mar. 25, 2013.
Japanese Office Action dated Mar. 19, 2013, re JP App. No. 2011-517515. w/Machine Trans.
Japanese Office Action re JP Application No. 2011-529256, dated Mar. 12, 2013.
Japanese Office Action, re JP Application No. 2011-506496, dated Mar. 8, 2013.
Korean Notice of Allowance re KR Application No. KR 10-2011-7009321, dated Apr. 30, 2103.
Korean Notice of Allowance, re KR Patent Application No. KR 10-2011-7009318, dated Mar. 19, 2013.
U. S. Interview Summary re U.S. Appl. No. 13/003,505, dated May 8, 2013.
U.S. Notice of Allowance re U.S. Appl. No. 13/119,122, dated Mar. 5, 2013.
U.S. Notice of Allowance re U.S. Appl. No. 13/119,124, dated Mar. 15, 2013.
Akasaka, Tsutomu, "Remote Copy Technology of ETERNUS6000 and ETERNUS3000 Disk Arrays", Fujitsu Sci. Tech. J., Jan. 2006, vol. 42, Issue 1, pp. 9-16.
Amazon Elastic Compute Cloud (Amazon EC2)—Limited Beta, Amazon.com: Amazon EC2, Amazon Elastic Compute Cloud, Virtual Grid Computing: . . . p. 1 of 9, http://web.archive.org/web/20070705164650rn_2/www.amazon.com/b?ie=UTF8&node=2... Jun. 18, 2010.

(56) References Cited

OTHER PUBLICATIONS

Aref, et al.: "Nile: A Query Processing Engine for Data Streams", Department of Computer Sciences Purdue University, West Lafayette, IN., USA, Data Engineering, 2004. Proceedings. 20th International Conference on Mar. 30-Apr. 2, 2004.
Ari, Ismail: "Design and Management of Globally-Distributed Network Caches", University of California Santa Cruz, Sep. 2004, 220 pages.
Australian Office Action (Exam Report No. 2) re AU Application No. 2009240392, dated Sep. 25, 2012.
Australian Office Action re AU Application No. 2009240392, dated May 1, 2012.
Australian Office Action re AU Application No. 2009268792, dated Jun. 8, 2012.
Australian Office Action re AUu Application No. 2009268792, dated Nov. 13, 2012.
Australian Office Action, re AU Application No. 2009-268716, dated Feb. 29, 2012.
Australian Office Action, re AU Application No. 2009276965, dated Mar. 22, 2012.
Australian Office Action, re AU Application No. 2009296490, issued Feb. 4, 2013.
Australian Office Action, re AU Application No. 2009296495, dated Apr. 5, 2012.
Australian Office Action, re AU Application No. 2009296496, dated May 23, 2012.
Australian Office Action, re AU Application No. 2009296500, dated Apr. 13, 2012.
Australian Office Action, re AU Application No. 2009296744, dated Apr. 19, 2012.
Canadian Office action, re CA Application No. CA 2,738,634, dated Dec. 20, 2013.
Canadian Office Action, re CA Application No. CA 2722,415, dated Feb. 18, 2014.
Cheeha Kim, "An Efficient Multicast Data Forwarding Scheme for Mobile Ad Hoc Networks", Information Networking, Convergence in Broadband and Mobile Networking, International Conf., Lecture Notes in Computer Science, Jan. 31-Feb. 2, 2005, vol. 3391/2005, 510-519, DOI: 10.1007/978-3-540-30582-8_53.
Chinese Notice of Rejection, re CN Application No. 200980109783. 4, dated Nov. 20, 2013. (With Machine Translation).
Chinese Office Action, re CN Application No. 200980126972.2, dated Mar. 17, 2014 (with machine translation).
Chinese Office Action, re CN Application No. 200980126972.2, dated Sep. 2, 2013. w/machine translation.
Chinese Office Action, Second, re CN Application No. 200980138485.8, dated May 30, 2013.
Chou, et al.: "Dynamic route mainenance for geographic forwarding in mobile ad hoc networks," Computer Networks 52 (2008) 418-431.
EPO Exam Report re App. No. 09723251.6, dated Nov. 11, 2010.
EPO, Extended Search Report re EPO App. No. 09734559.9, dated Jul. 25, 2011.
Ertaul et al.: "ECC Based Threshold Cryptography for Secure Data Forwarding and Secure Key Exchange in MANET (I)", LNCS 3462, pp. 102-113, Networking 2005, May 2-6, 2005 University of Waterloo, Waterloo Ontario Canada.
Ertaul et al: "Implementation of Homomorphic Encryption Schemes for Secure Packet Forwarding in Mobile Ad Hoc Networks (MANETs)", IJCSNS, vol. 7, Issue No. 11, pp. 132-141, Nov. 2007.
European Extended Search Report, re EP Application No. 09743557.2 dated Nov. 9, 2012.
European Extended Search Report, re EP Application No. 09795041, dated Oct. 11, 2011.
European Extended Search Report, re EP Application No. 09816904. 8, dated Feb. 6, 2012.
European Office Action, re EP Application No. 09795041, dated Aug. 9, 2012.
European Supplemental Search Report, re EP Application No. 09795034.9, dated Nov. 7, 2011.

Girao et al.: "TinyPEDS: Tiny Persistent Encrypted Data Storage in Asynchronous Wireless Sensor Networks", Ad Hoc Networks, vol. 5, Issue 7, p. 1073-1089 (Sep. 2007).
Hirose, et al., "Computer Software Dictionary," Japan, Maruzen Company, Limited, Apr. 5, 1996, third printing, pp. 92-93 and 106-107.
Hoke, et al.: "InteMon: Continuous Mining of Sensor Data in Large-scale Self-* Infrastructures", Carnegie Mellon University. Appears in ACM SIGOPS Operating Systems Review, 40(3): pp. 38-44. ACM Press, Jul. 2006.
Huang et al., "Secure Data Forwarding in Wireless Ad Hoc Networks", IEEE International Conference, May 16-20, 2005, pp. 3535-3531, vol. 5.
Ito, Takeshi et al. "Technologies of ETERNUSVS900 Storage Virtualization Switch", Fujitsu Sci. Tech. J., Jan. 2006, vol. 42, Issue 1, pp. 17-23.
Japanese Decision of Rejection re JP Application No. 2011-529255, dated Nov. 14, 2012.
Japanese Office Action (Notice of Rejection), re JP Application No. JP 2011-500858, dated May 29, 2012.
Japanese Office Action dated Apr. 13, 2012, re JP App. No. 2011-517515.
Japanese Office Action re JP Application No. 2011-529185, dated Aug. 22, 2013.
Japanese Office Action re JP Application No. 2011-529185, dated Jan. 23, 2013.
Japanese Office Action re JP Application No. 2011-529255, dated Apr. 26, 2012.
Japanese Office Action re JP Application No. 2011-529256, dated Aug. 22, 2013.
Japanese Office Action re JP Application No. JP 2011-517508, dated Aug. 2, 2013.
Japanese Office Action re JP Application No. JP 2011-517508, dated Feb. 27, 2013.
Japanese Office Action re JP Application No. JP 2011-517508, dated Feb. 4, 2014.
Japanese Office Action re JP Application No. JP 2011-521163, dated May 23, 2012.
Japanese Office Action re JP Application No. 2011-508626, dated Sep. 27, 2012.
Japanese Office Action, re JP App. No. 2011-529258, dated Apr. 26, 2012.
Japanese Office Action, re JP Application No. 2011-504044, dated Sep. 4, 2012.
Japanese Office Action, re JP Application No. 2011-506496, dated Mar. 21, 2012.
Japanese Office Action, re JP Application No. 2011-529253, dated Feb. 13, 2013.
Ji, Lusheng et al., "On Providing Secure and Portable Wireless Data Networking Services: Architecture and Data Forwarding Mechanisms", IPSJ Journal, Oct. 2004, vol. 45, Issue 10, pp. 2261-2269.
Kim, Youngmin, "An Efficient Multicast Data Forwarding Scheme for Mobile Ad Hoc Networks", Information Networking, Convergence in Broadband and Mobile Networking, International Conf., 2005, vol. ICOIN 2005, Jeju Island, Korea, Jan. 31-Feb. 2, 2005.
Komandur et al., "SPAM: A Data Forwarding Model for Multipoint-to-Multipoint Connection Support in ATM Networks", IC3N, IEEE Computer Society, Sep. 1997, pp. 1-7.
Korean Office Action, re KR Application No. 10-2011-7000703, dated Jul. 16, 2012.
Mellor, Chris: "Storage in the cloud—Doppler shift or marketing gloss?", Storage in the cloud—Feature—Techworld.com, Published: 12:00, Dec. 18, 2007, http://features.techworld.com/storage/3893/storage-in-the-cloud/.
Na, et al.: "GLR: A novel geographic routing scheme for large wireless ad hoc networks," Computer Networks 50 (2006) 3434-3448.
Pakkala, et al.: "Towards a Peer-to-Peer Extended Content Delivery Network", pp. 1-5, XP002615892, retrieved from the Internet: URL:http://www.eurasip.org/Proceedings/Ext/IST05/papers/99.pdf on Jan. 7, 2011.
PCT International Preliminary Report and Report on Patentability re App. No. PCT/US2009/49763, dated Jan. 20, 2011.

(56) References Cited

OTHER PUBLICATIONS

PCT International Preliminary Report on Patentability and Written Opinion re App. No. PCT/US2009/041817, dated Oct. 26, 2010.
PCT International Preliminary Report on Patentability and Written Opinion re App. No. PCT/US2009/042971, dated Nov. 9, 2010.
PCT International Preliminary Report on Patentability and Written Opinion re App. No. PCT/US2009/49755, dated Jan. 20, 2011.
PCT International Preliminary Report on Patentability and Written Opinion re App. No. PCT/US2009/58052, dated Mar. 29, 2011.
PCT International Preliminary Report on Patentability and Written Opinion re App. No. PCT/US2009/58364, dated Mar. 29, 2011.
PCT International Preliminary Report on Patentability and Written Opinion re App. No. PCT/US2009/58367, dated Mar. 29, 2011.
PCT International Preliminary Report on Patentability and Written Opinion re App. No. PCT/US2009/58368, dated Mar. 29, 2011.
PCT International Preliminary Report on Patentability and Written Report re App. No. PCT/US2009/58376, dated Mar. 29, 2011, mailed on Apr. 7, 2011.
PCT International Report on Patentability and Written Opinion Re PCT/US2009/036171 dated Sep. 21, 2010.
PCT International Report on Patentability and Written Opinion re PCT/US2009/037579, dated Oct. 12, 2010.
PCT International Report on Patentability re App. No. PCT/US2009/50008, dated Feb. 10, 2011.
PCT International Search Report and Written Opinion, PCT/US2009/036171, dated Sep. 4, 2009 in 13 pgs.
PCT International Search Report and Written Opinion, PCT/US2009/037579, dated Jun. 24, 2009, 12 pages.
PCT International Search Report re App. No. PCT/US2009/41817, dated Jun. 30, 2009.
PCT International Search Report re App. No. PCT/US2009/42971, dated Jun. 24, 2009.
PCT International Search Report re App. No. PCT/US2009/49755, dated Aug. 7, 2009.
PCT International Search Report re App. No. PCT/US2009/49763, dated Oct. 16, 2009.
PCT International Search Report re App. No. PCT/US2009/50008, dated Aug. 11, 2009.
PCT International Search Report re App. No. PCT/US2009/58052, dated Nov. 4, 2009.
PCT International Search Report re App. No. PCT/US2009/58362, dated Nov. 2, 2009.
PCT International Search Report re App. No. PCT/US2009/58368, dated Oct. 26, 2009.
PCT International Search Report re App. No. PCT/US2009/58376, dated Oct. 28, 2009.
PCT International Search Report, re App. No. PCT/US2009/58364, dated Nov. 4, 2009.
PCT International Search Report, re App. No. PCT/US2009/58367, dated Oct. 26, 2009.
Pierre, et al.: "Globule: A Collaborative Content Delivery Network", IEEE Communications Magazine, vol. 44, No. 8, Aug. 1, 2006, pp. 127-133.
Purczynski et al.: "Juggling with packets: floating data storage," , Internet Archive, Oct. 2003. [retrieved on Apr. 25, 2012]. Retrieved from the Internet:<URL: http://web.archive.org/web/20031017082346/http://lcamtuf.coredump.cx/juggling_with_packets.txt.
Sharma, et al.: "Data Warehouse and Olap Technology Part -1", power point presentation, first cited on Sep. 29, 2008 in U.S. Appl. No. 12/241,003.
Stefansson, et al.: "MyriadStore: Technical Report", Swedish Institute of Computer Science (SICS), Technical Report T2006:09, ISSN 1100-3154, ISRN: SCIS-T02006/09-SE. May 3, 2006 in 13 pages.
Tanenbaum, Andrew S.: "Network Protocols", Computing Surveys, vol. 13, No. 4, Dec. 1, 1981, pp. 453-489.
U. S. Interview Summary mailed Aug. 8, 2012, re U.S. Appl. No. 12/989,638.
U. S. Interview Summary re U.S. Appl. No. 13/003,505, dated Sep. 20, 2012.
U. S. Non-Final Office Action mailed May 14, 2009, re U.S. Appl. No. 12/132,804.
U. S. Notice of Allowance mailed Aug. 7, 2008, re U.S. Appl. No. 12/046,757.
U. S. Notice of Allowance mailed Jul. 15, 2009, re U.S. Appl. No. 12/132,804.
U. S. Notice of Allowance mailed Jul. 26, 2010, re U.S. Appl. No. 12/240,802.
U. S. Notice of Allowance mailed Sep. 15, 2010, re U.S. Appl. No. 12/099,498.
U. S. Office Action re U.S. Appl. No. 12/240,757, dated Jun. 22, 2009.
U. S. Office Action re U.S. Appl. No. 13/003,505, dated Aug. 22, 2012.
U. S. Office Action re U.S. Appl. No. 13/003,505, dated Feb. 11, 2013.
U.S. Interview Summary mailed Aug. 6, 2012, re U.S. Appl. No. 12/991,383.
U.S. Interview Summary mailed Aug. 6, 2012, re U.S. Appl. No. 13/057,072.
U.S. Interview Summary mailed Aug. 6, 2012, re U.S. Appl. No. 13/119,124.
U.S. Interview Summary mailed Aug. 7, 2012, re U.S. Appl. No. 13/003,502.
U.S. Interview Summary mailed Aug. 7, 2012, re U.S. Appl. No. 13/119,122.
U.S. Interview Summary mailed Aug. 7, 2012, re U.S. Appl. No. 13/119,147.
U.S. Interview Summary re U.S. Appl. No. 13/119,133, dated Aug. 7, 2012.
U.S. Non-Final Office Action mailed Apr. 16, 2010, re U.S. Appl. No. 12/099,498.
U.S. Notice of Allowance mailed Aug. 31, 2012, re U.S. Appl. No. 13/119,133.
U.S. Notice of Allowance mailed Dec. 14, 2012, re U.S. Appl. No. 12/991,383.
U.S. Notice of Allowance mailed Dec. 6, 2012, re U.S. Appl. No. 12/052,345.
U.S. Notice of Allowance mailed Jul. 25, 2013, re U.S. Appl. No. 13/003,505.
U.S. Notice of Allowance mailed Jun. 10, 2013, re U.S. Appl. No. 13/119,147.
U.S. Notice of Allowance mailed Sep. 17, 2012, re U.S. Appl. No. 13/057,072.
U.S. Notice of Allowance re U.S. Appl. No. 12/052,345, dated Apr. 2, 2012.
U.S. Notice of Allowance re U.S. Appl. No. 12/052,345, dated Dec. 29, 2011.
U.S. Notice of Allowance re U.S. Appl. No. 12/989,638, dated Nov. 5, 2012.
U.S. Office Action re U.S. Appl. No. 12/052,345, dated Oct. 4, 2011.
U.S. Response to U.S. Office Action re U.S. Appl. No. 12/170,901, dated Jun. 12, 2009.
U.S. Response to U.S. Office Action re U.S. Appl. No. 12/170,925, dated Jul. 12, 2009.
U.S. Response to U.S. Office Action re U.S. Appl. No. 12/241,003, dated Jun. 11, 2009.
Wagner, et al.: "A Network Application Programming Interface for Data Processing in Sensor Networks", Rice University Technical Report TREE0705. 10 pages, Submitted to IPSN (Jan. 2007)—http://www.citeulike.org/user/leosteinfeld/article/5146294.
Canadian Office Action, re CA Application No. CA 2730,310, dated May 16, 2014.
European Examination Report, re EP Application No. 09743557.2 dated Jul. 18, 2014.
European Supplemental Search Report re EPO Application No. 09 81 6907, mailed Jul. 10, 2014.

US 8,909,738 B2

REDUNDANT DATA FORWARDING STORAGE

CROSS-REFERENCE TO RELATED APPLICATIONS

This application is a continuation of U.S. application Ser. No. 12/052,345, filed Mar. 20, 2008, entitled "Redundant Data Forwarding Storage," herein incorporated by reference in its entirety. Any and all priority claims identified in the Application Data Sheet, or any correction thereto, are hereby incorporated by reference under 37 C.F.R. §1.57.

FIELD AND BACKGROUND

At least some embodiments disclosed herein relate to data storage, and more particularly, to redundant data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for redundant data forwarding.

In general, in one aspect, the invention features a method including, in two or more networks of interconnected computer system nodes, receiving a request from a source system in a first network to store data, directing the data to a first computer memory in a first network, directing a first copy of the data to a second computer memory in a second network, continuously forwarding the data from the first computer memory to other computer memories in the first network without storing on any physical storage device in the first network, and continuously forwarding the first copy of the data from the second computer memory to other computer memories in the second network without storing on any physical storage device in the second network.

In another aspect, the invention features a system including, at least two networks wherein computer system nodes are each adapted to receive data and copies of data and continuously forward the data and copies of data from computer memory to computer memory without storing on any physical storage device in response to a request to store data from a requesting system.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGS. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous redundant data forwarding system, i.e., data and copies of data are stored by continually forwarding it from one node memory to another node memory. Copies of data may continuously forwarded in one or more networks.

Figure 1:
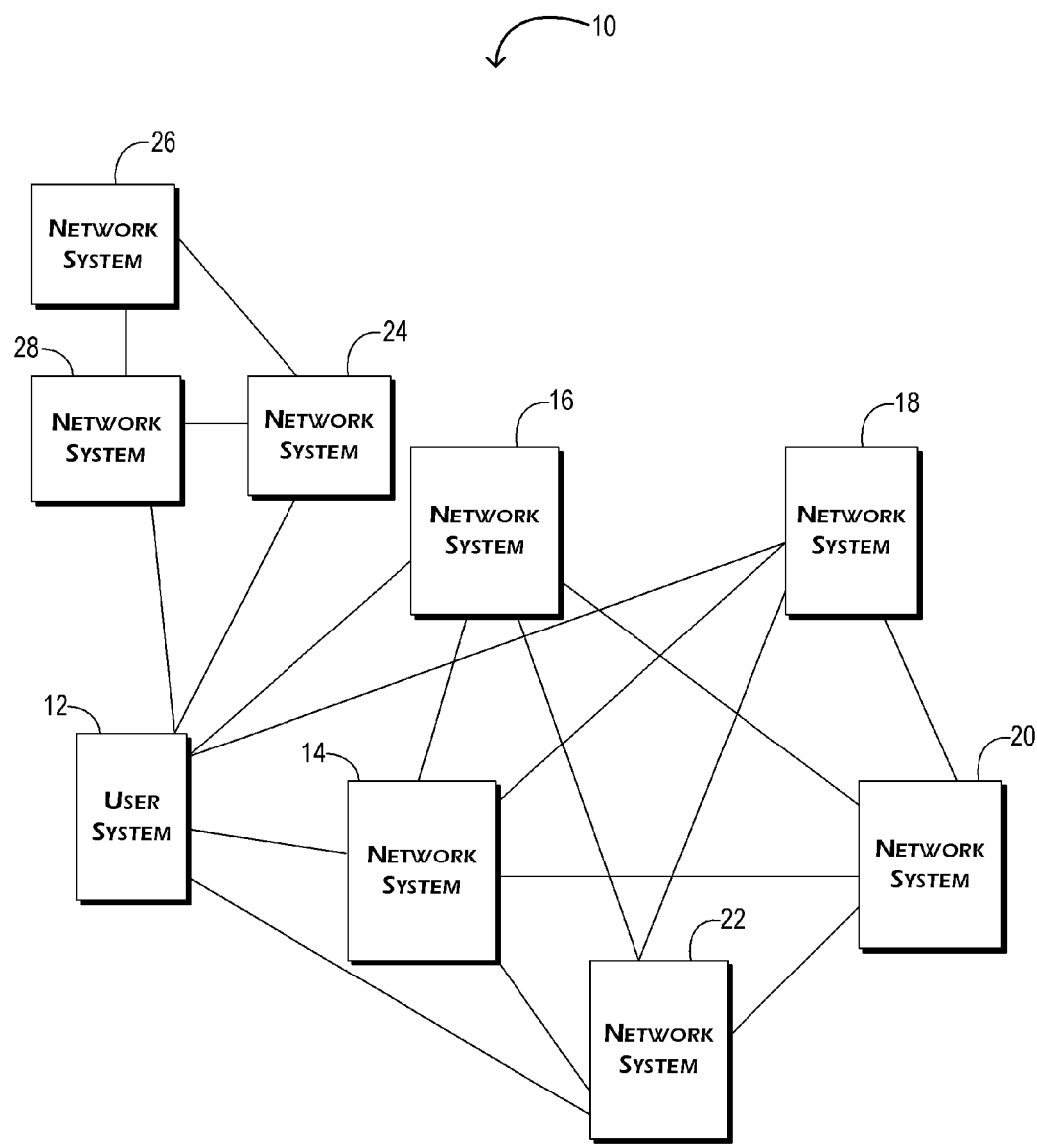
FIG. 1 is a block diagram of an exemplary system.

As shown in FIG. 1, an exemplary system 10 includes a user system 12 and a number of network systems 14, 16, 18, 20, 22. Each of the network systems 14, 16, 18, 20, 22 can be considered to be a node in the system 10 and one such network system may be designated as a central server, such as network system 14, which may assume a control position in system 10. Each of the nodes 14, 16, 18, 20, 22 may be established as a privately controlled network of peers under direct control of the central server 14. Peered nodes may also be a mix of private and public nodes, and thus not under the direct physical control of the central server 14. The system 10 may also be wholly public where the central server 14 (or servers) has no direct ownership or direct physical control of any of the peered nodes.

In one example, nodes 14, 16, 18, 20 and 22 can be considered a private network. In a private network, an administrator controls the nodes and may designate which node is the central server. The system 10 can also include one or more additional nodes. For example, nodes 24, 26 and 28. These nodes 24, 26 and 28 may be considered to be part of one or more public networks in which the administrator has little or no control.

Figure 2:
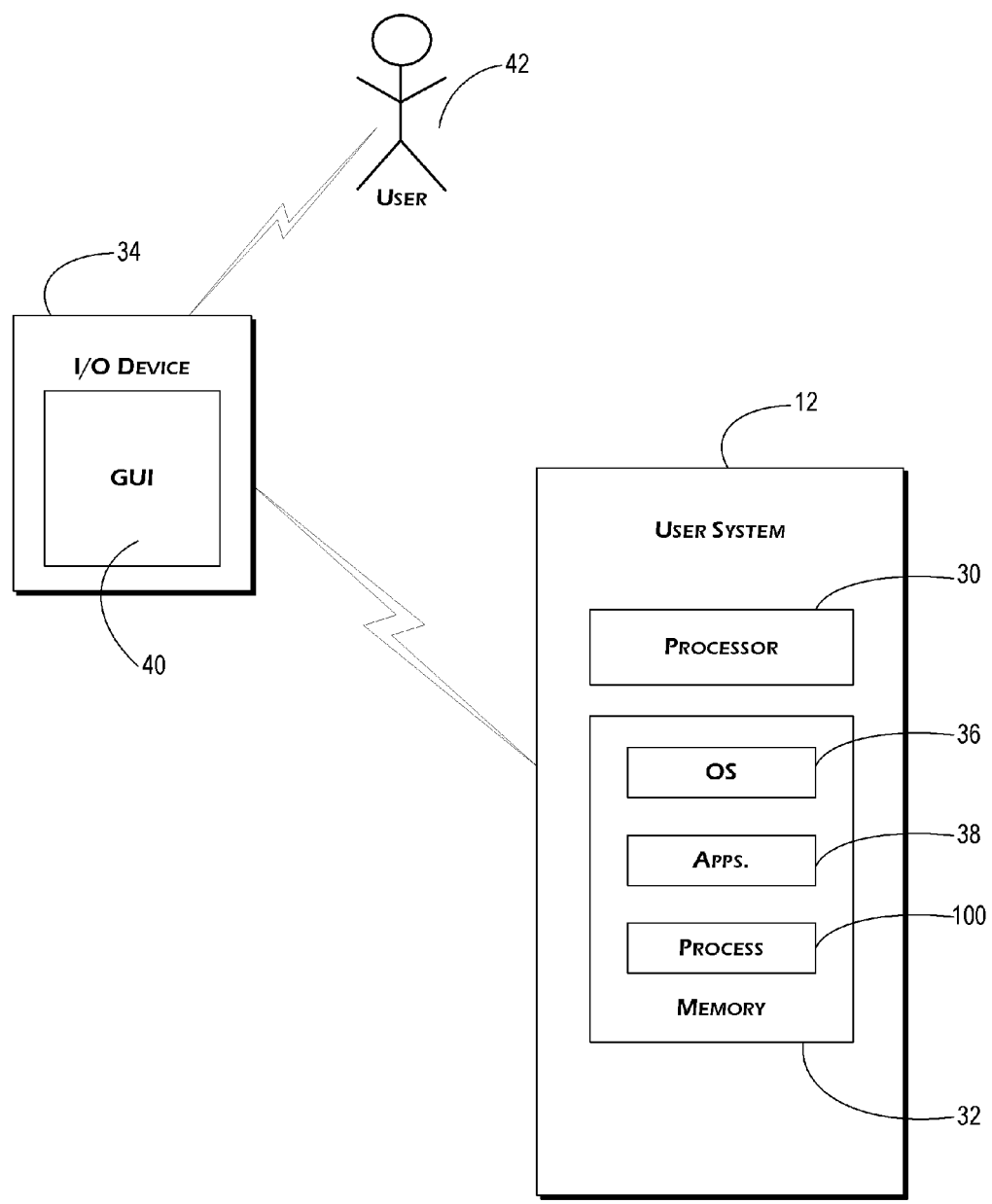
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
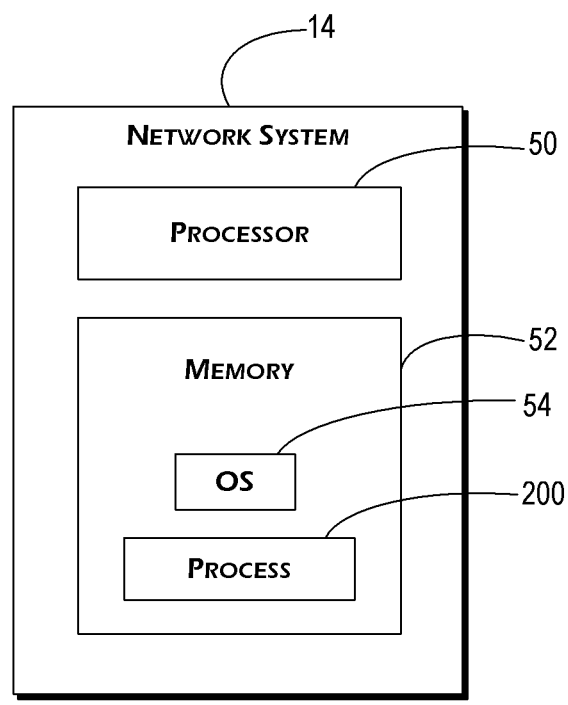
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices, and copies of data, which are used to provide redundancy, are stored locally or on remote physical storage devices such as disk drives. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data and does not use physical data storage to provide data redundancy. When a request to store data is received by the central server 14 from storage process 100, data is directed to a node in the system 10 where it is then continuously forwarded from node memory to node memory in the system 10 by the data forwarding process 200 in each of the network nodes without storing on any physical storage medium such as a disk drive. The request to store data makes at least one copy of the data, which is directed to a node in a secondary private or public network, or directed to nodes on more than one network, where it too is continuously forwarded from node memory to node memory in the secondary private or public network. The forwarded data resides only for a very brief period of time in the memory of any one node in the system 10. Data and copies of data are not stored on any physical storage medium in any network node.

When a request to retrieve data is received by the central server 14 from storage process 100, the requested data, which is being forwarded from node memory to node memory in the system 10, is retrieved.

Data forwarded in this manner can be segmented and segments forwarded as described above. Still, the segmented data is not stored on any physical storage medium in any network node, but merely forwarded from the memory of one node to the memory of another node.

Figure 4:
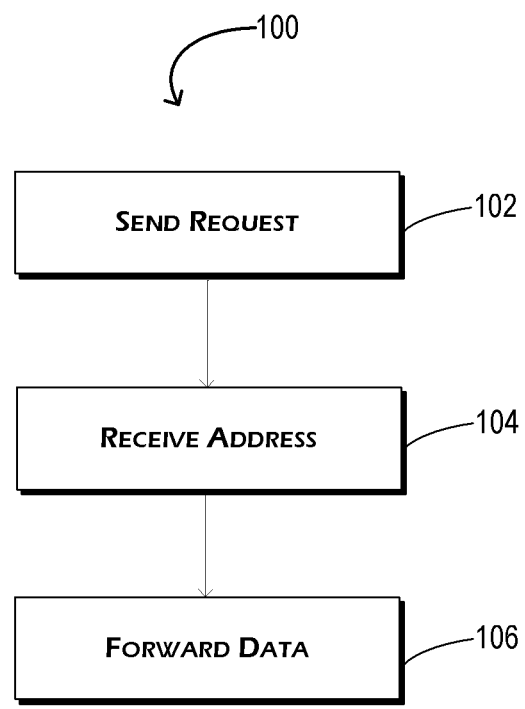
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) first address of a node and a second address of a node from the central server 14 and forwards (106) the data to the node memory represented by the received first address and a copy of the data to the node memory represented by the received second address.

Figure 5:
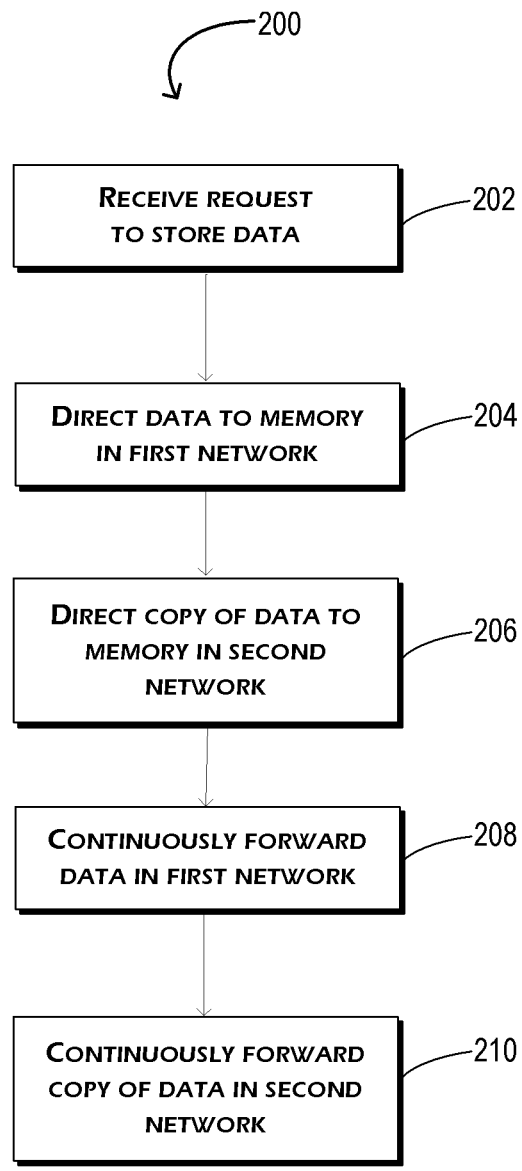
FIG. 5 is a flow diagram of a process.

As shown in FIG. 5, data forwarding process 200 includes receiving (202) a request from a source system in a first network to store data.

Process 200 directs (204) the data to the first computer memory in a first network and directs (206) a first copy of the data to a second computer memory in a second network. Directing (206) may be to node memories in one or more networks, both private and/or public.

Process 200 continuously forwards (208) the data from the first computer memory to other computer memories in the first network without storing on any physical storage device in the first network.

Continuously forwarding (208) includes detecting a presence of the data in memory of the specific node of the first network and forwarding the data to another computer memory of a node in the first network of interconnected computer system nodes without storing any physical storage device.

Process 200 continuously forwards (210) the first copy of the data from the second computer memory to other computer memories in the second network without storing on any physical storage device in the second network.

Continuously forwarding (210) includes detecting a presence of the first copy of data in memory of the specific node of the second network, and forwarding the first copy of the data to another computer memory of a node in the second network of interconnected computer system nodes without storing any physical storage device.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

New nodes and node states may be added and/or deleted from the system 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the system 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data and copies of data are passed, routed, forwarded from node memory to node memory. The data and copies of data are never downloaded until the authorized user calls for the data. A user on the system may authorize more than one user to have access to the data.

A primary goal in process 200 is to generate a redundant data storage and management system where the redundant data is never fixed in physical storage, but in fact, is continually being routed/forwarded from node memory to node memory. The path of the nodes to which redundant data is forwarded may also be altered by the central server 14 to adjust for system capacities and to eliminate redundant paths of data that may weaken the security of the network due to the increased probability of data path without this feature.

The invention can be implemented to realize one or more of the following advantages. One or more networks create redundant data storage without caching or downloads. Redundant data storage and management are accomplished via a constant routing of the redundant data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computerized method comprising:
  receiving a request from a source node to store data, wherein the source node is outside of a first network of interconnected nodes that are configured to store one or more portions of the data and the source node is outside of a second network of interconnected nodes that are configured to store one or more portions of the data, each of the interconnected nodes in the first network and the second network comprising a memory;
  directing at least a portion of the data to a first memory of a first node in the first network;
  directing a first copy of the portion of the data to a second memory of a second node in the second network;
  intermittently forwarding the portion of the data among the first memory and memories of other nodes in the first network without storing the portion of the data on any physical storage device of the interconnected nodes in the first network, wherein the interconnected nodes in the first network to which the portion of the data is forwarded are determined dynamically based at least in part on status of one or more of the interconnected nodes in the first network or previous paths used for forwarding one or more portions of the data; and
  intermittently forwarding the first copy of the portion of the data among the second memory and memories of other nodes in the second network without storing the first copy of the portion of the data on any physical storage device of the interconnected nodes in the second network, wherein the interconnected nodes in the second network to which the first copy of the portion of the data is forwarded are determined dynamically,
  wherein physical storage devices include one or more of hard disks, magnetic disks, magnetic tape, magneto optical disks, or optical disks.

2. The computerized method of claim 1 further comprising:
  directing a second copy of the portion of the data to a third memory of a third node in a third network of interconnected nodes; and
  intermittently forwarding the second copy of the portion of the data among the third memory and memories of other nodes in the third network without storing the second copy of the data on any physical storage device of the interconnected nodes in the third network.

3. The computerized method of claim 1, wherein each of the networks comprise one or more of a private network and a public network.

4. The computerized method of claim 1 wherein at least one of said intermittently forwarding of the portion of the data and said intermittently forwarding of the first copy of the portion of the data comprises:
  determining a first address of a first available node in the first network to receive the portion of the data based on one or more first factors;
  determining a second address of a second available node in the second network to receive the first copy of the portion of the data based on one or more second factors;
  sending a first message to a first specific node of the first network associated with memory that contains the portion of the data, the first message comprising the first address of the first available node and a request to forward the portion of the data; and
  sending a second message to a second specific node of the second network associated with memory that contains the first copy of the portion of the data, the second message comprising the second address of the second available node and a request to forward the first copy of the portion of the data.

5. The computerized method of claim 4 wherein the one or more first factors and the one or more second factors comprise network traffic analysis and available memory.

6. The computerized method of claim 1 wherein at least one of said intermittently forwarding of the portion of the data and said intermittently forwarding of the first copy of the portion of the data comprises:
  detecting presence of the portion of the data in a first specific memory of a first specific node of the first network;
  forwarding the portion of the data to a second specific memory of a second specific node in the first network without storing the portion of the data on any physical storage device of the interconnected nodes of the first network;
  detecting presence of the first copy of the portion of the data in a third specific memory of a third specific node of the second network; and
  forwarding the first copy of the portion of the data to a fourth specific memory of a fourth node in the second network without storing the first copy of the portion of the data on any physical storage device of the interconnected nodes of the second network.

7. The computerized method of claim 6 further comprising:
  associating one or more specific users with the portion of the data; and
  retrieving the portion of the data in response to receiving a retrieval request for the data from one of the specific users.

8. A non-transitory computer readable medium configured to store software code that is readable by a computing system having one or more processors, wherein the software code is executable on the computing system in order to cause the computing system to perform operations comprising:
  receiving a request to store data from a source node that is not part of a first network of interconnected nodes or a second network of interconnected nodes;
  intermittently forwarding at least a portion of the data between memories of the interconnected nodes in the first network without storing the portion of the data on any physical storage device of the interconnected nodes in the first network, wherein the interconnected nodes in the first network to which the portion of the data is forwarded are determined dynamically based at least in part on status of one or more of the interconnected nodes in the first network or previous paths used for forwarding one or more portions of the data; and
  intermittently forwarding a first copy of the portion of the data between memories of the interconnected nodes in the second network without storing the first copy of the portion of the data on any physical storage device of the interconnected nodes in the second network, wherein the interconnected nodes in the second network to which the first copy of the portion of the data is forwarded are determined dynamically,
  wherein physical storage devices include one or more of hard disks, magnetic disks, magnetic tape, magneto optical disks, or optical disks.

9. The non-transitory computer readable medium of claim 8 wherein the operations further comprise intermittently forwarding a second copy of the portion of the data between memories of the interconnected nodes in a third network without storing the second copy of the portion of the data on any physical storage device of the interconnected nodes in the third network.

10. The non-transitory computer readable medium of claim 8 wherein at least one of said intermittently forwarding of the portion of the data and said intermittently forwarding of the first copy of the portion of the data comprises:
  determining a first address of a first node in the first network that is available to receive the portion of the data, wherein the determination is based on one or more factors;
  sending a message to a specific node that is associated with memory that contains the portion of the data, the message comprising the address of the first node and a request to forward the portion of the data to the first node; and
  applying a time stamp to the portion of the data in memory of the first node in the first network.

11. The non-transitory computer readable medium of claim 10 wherein the one or more factors comprise network traffic analysis and available memory.

12. The non-transitory computer readable medium of claim 10 wherein at least one of said intermittently forwarding the data of the portion of the data and said intermittently forwarding of the first copy of the portion of the data further comprises:
  detecting a presence of the portion of the data in a memory of the specific node; and
  forwarding the portion of the data to memory of the first node in the first network from the memory of the specific node of the first network that contains the portion of the data without storing the portion of the data on any physical storage device of the interconnected nodes of the first network.

13. The non-transitory computer readable medium of claim 12 wherein the operations further comprise:
  associating one or more specific users with the portion of the data; and
  retrieving the portion of the data in response to receiving a request for the data from one of the specific users.

14. The non-transitory computer readable medium of claim 10 wherein the first copy of the portion of the data is sent to a private network selected by a user or user application.

15. A system comprising:
  at least two networks of interconnected nodes, each node comprising a memory and each node being configured to receive one or more portions of data or a copy of one or more portions of the data from other memories of nodes within the respective network,
  wherein each of the interconnected nodes is further configured to intermittently forward the portion of the data or the copy of the portion of the data among the memories of the interconnected nodes of the respective network without storing the portion of the data or the copy of the portion of the data on any physical storage device associated with the interconnected nodes of the respective network, and
  wherein the interconnected nodes to which the portion of the data or the copy of the portion of the data is forwarded are determined dynamically based at least in part on status of one or more of the interconnected nodes or previous paths used for forwarding one or more portions of the data or a copy of one or more portions of the data,
  wherein physical storage devices include one or more of hard disks, magnetic disks, magnetic tape, magneto optical disks, or optical disks.

16. The system of claim 15 wherein at least one node of the interconnected nodes is adapted to encrypt the portion of the data or the copy of the portion of the data.

17. The system of claim 15 wherein at least one node of the interconnected nodes is adapted to intermittently forward a second copy of the portion of the data between memories of the interconnected nodes in a third network without storing the second copy of the portion of the data on any physical storage device of the interconnected nodes in the third network.

18. A computer system comprising:
a computer memory;
at least one network interface configured to allow the computer system to communicate with two or more networks of interconnected nodes, each of the interconnected nodes in the two or more networks comprising a memory; and
a processor configured to:
  direct at least a portion of data to a first memory of a node in a first network from a source node, wherein the source node is not in the two or more networks; and
  initiate intermittent forwarding of the portion of the data among the first memory and other memories of interconnected nodes of the first network without storing the portion of the data on any physical storage device of the interconnected nodes in the first network,
wherein the interconnected nodes in the first network to which the portion of the data is forwarded are determined dynamically based at least in part on status of one or more of the interconnected nodes in the first network or previous paths used for forwarding one or more portions of the data,
wherein physical storage devices include one or more of hard disks, magnetic disks, magnetic tape, magneto optical disks, or optical disks.

19. The computer system of claim 18, wherein the processor of the computer system is further configured to:
  detect a presence of the portion of the data in a first specific memory of a first specific node in the first network;
  determine based on one or more factors an address of a second memory of a second node in the first network, wherein the second memory is available to receive the portion of the data; and
  send a message to the first specific node in the first network, the message comprising an address of the second memory and a request to forward the portion of the data to the second memory.

20. The computer system of claim 19, wherein the processor is further configured to:
  associate one or more specific users with the portion of the data; and
  retrieve the portion of the data in response to receiving a request for the data from one of the specific users.

* * * * *